April 22, 1958  M. PONISCH  2,831,418
MIXING AND REFINING MACHINE
Filed Dec. 27, 1955  2 Sheets-Sheet 1
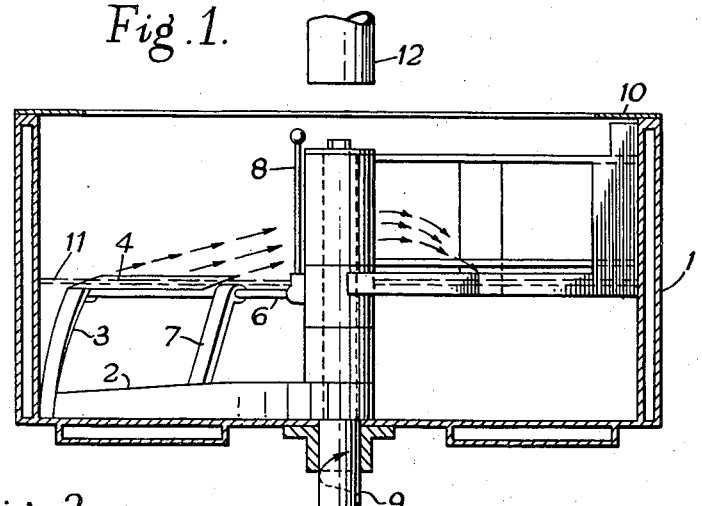
Fig. 1.
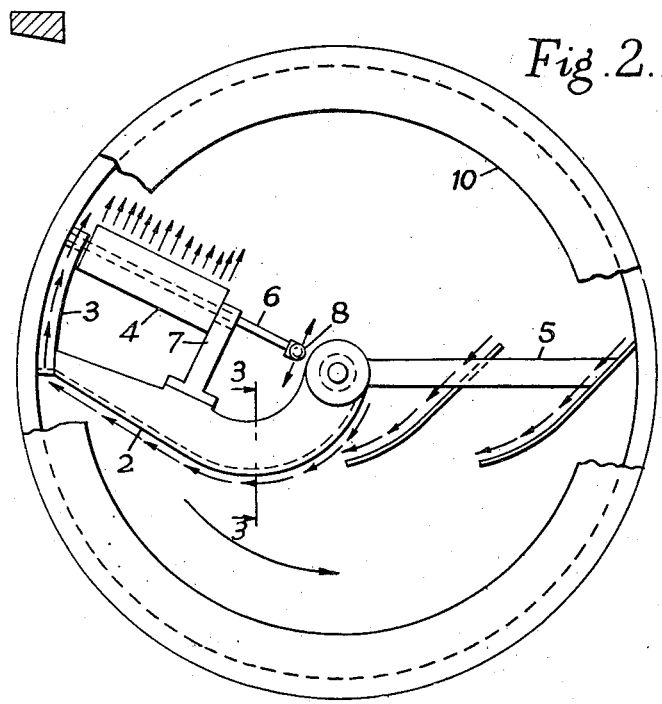
Fig. 3.
Fig. 2.

April 22, 1958 — M. PONISCH — 2,831,418
MIXING AND REFINING MACHINE
Filed Dec. 27, 1955
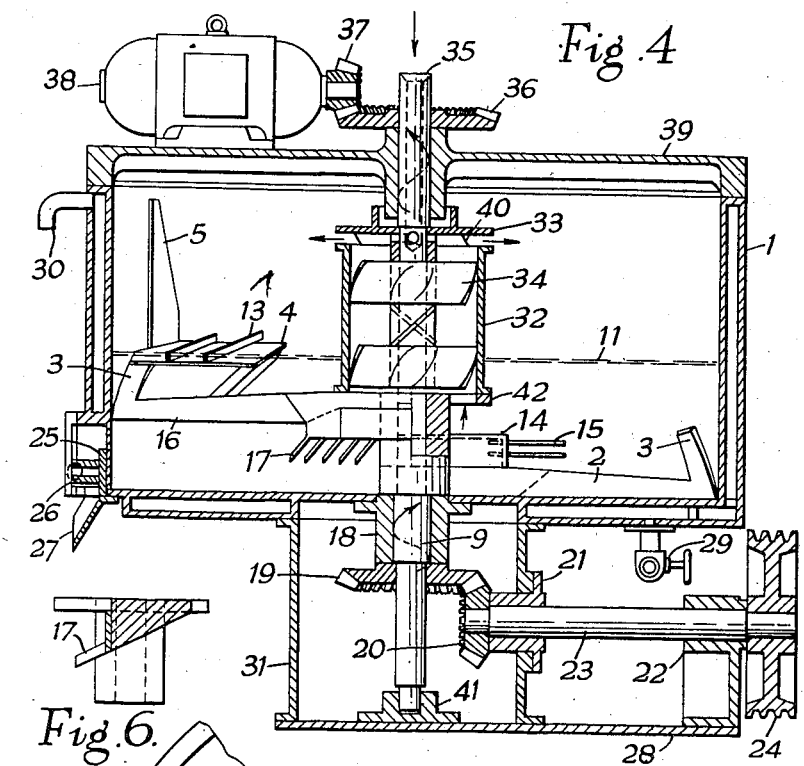
Fig. 4
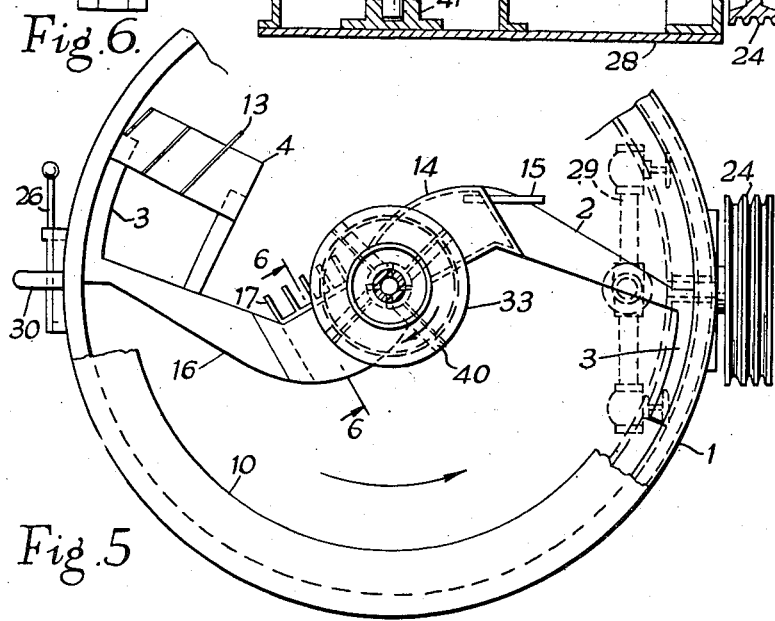
Fig. 6
Fig. 5

United States Patent Office 2,831,418
Patented Apr. 22, 1958

2,831,418

MIXING AND REFINING MACHINE

Max Pönisch, Offenbach, Bieber, Germany

Application December 27, 1955, Serial No. 555,663

Claims priority, application Germany January 15, 1955

6 Claims. (Cl. 99—236)

The mixing and refining of chocolate masses, known in technical language as "conching," is difficult when the initial fat content of the mass is low, because the chocolate masses must be converted in the conche from the powder form in which they arrive from the grinding mills into a fluid state, without the addition of cocoa butter.

Conches are known which can also treat chocolate masses having a low fat content, insofar as the mixing and the removal of moisture and acid from the masses are concerned. "Refining" however is also understood to include the development of the pure, rich cacao aroma, for example by the action of fresh air at a certain temperature. It is also found that after a time hard pellets of mass are formed. Particularly in the case of conches which mix only in one plane, large quantities of such pellets are formed. The mass enclosed in the pellets is withdrawn from the treatment, so that the time required for the conching process is increased.

The problem is thus, by the use of suitable means and within a shortened period of time, to liquefy a chocolate mass which initially has a low fat content and to refine it to form a chocolate having the purest cacao aroma These problems are completely solved by the subject of the invention.

One or more mixing arms are mounted to rotate about the central axis in a container which can be heated and cooled. In the first embodiment of the invention, a mixing arm of arcuate form is provided. The leading side of the mixing arm is constructed entirely or partially as a vertical surface, which drives the particles of mass from inside to outside. At the outer end of the mixing arm a flat piece is fastened at an acute angle to the bottom of the container, and sweeps close past the walls of the container. The particles of mass are driven upwards on the inclined surface. At the top end of the flat piece is fastened the so-called centrifugal and aerating plate which, in the case of a liquid mass, is partly submerged beneath the surface of the mass and partly projects above the surface of the mass. This centrifugal and aerating plate may be joined fast to the flat piece, or may be rockably mounted, as shown in the first embodiment. This aerating plate will always stand at a very acute angle to the surface of the mass, in order that the particles of mass will not be able to splash over the edge of the container. With the aid of an adjusting lever, the most favourable angle in relation to the surface of the mass can be adjusted in each individual case.

A far more advantageous action is given by the second embodiment, in which two mixing arms are provided. The bottom mixing arm sweeps over the bottom of the container and the lower part of the walls of the container. The centrifugal and aerating plate is rigidly connected to the top mixing arm, and the acute angle formed by it in relation to the surface of the mass is determined experimentally. The substantially improved aeration of the mass is achieved by the fact that, on the passing of the aerating plate, the chocolate mass is slightly displaced from the walls of the container by the stripper fastened on the aerating plate, so that between the walls of the container and the mass an air gap is produced, and the curtain of mass thrown off is subdivided several times by the mass separating plates. Cutting knives are mounted on the bottom and top mixing arms, and cut up any pellets of mass which may be formed.

In addition, on the top mixing arm a flange is provided which is equipped with inlet holes and on which a rising pipe is fastened.

A vertical shaft, which is separately driven from above and partially drilled hollow, is rotatably mounted in a cross-piece and provided with air outlet apertures; on its bottom part a number of propellers and a centrifugal disc are secured. On the bottom side of the centrifugal disc blades are fastened. The hub of the centrifugal disc is provided with air holes, which coincide with those in the shaft. The propellers sweep over the inner wall surface of the rising pipe, and the blades of the centrifugal disc sweep over the upper edge of the rising pipe.

The liquefied chocolate mass penetrates through the inlet holes in the flange into the rising pipe, is driven up by the propellers, and thrown off against the inner walls of the container by the centrifugal disc, while at the same time being mixed with sucked-in fresh air.

The subject of the invention is illustrated in the accompanying drawings in which:

Figure 1 shows an elevation of the first embodiment;
Figure 2 shows a top plan view; and
Figure 3 a section through the mixing arm.

1 is the heatable and coolable container, 2 the mixing arm, 3 the flat piece mounted at an acute angle, 4 the aerating plate, 5 the stripper, 6 the rockable axis, on which the aerating plate 4 is fastened, 7 the bearing support, 8 the adjusting lever, 9 the vertical driving shaft, 10 a cover ring, 11 the surface of the mass, 12 an air pipe.

In addition:

Figure 4 shows an elevation of the second embodiment;
Figure 5 a top plan view; and
Figure 6 a section through the top mixing arm.

1 is the heatable and coolable container, 2 the bottom mixing arm, 3 the flat pieces attached at an acute angle, 4 the aerating plate, 5 the stripper, 9 the vertical driving shaft, 10 the cover ring, 11 the surface of the mass, 13 the mass separation plates, 14 the mass guide plate fastened on the bottom mixing arm, 15 the cutting knives on the bottom mixing arm, 16 the top mixing arm, 17 the cutting knives of the top mixing arm, 18 a bearing flange, 19 a bevel wheel, 20 a bevel wheel, 21 a bearing flange, 22 a bearing block, 23 the horizontal driving shaft, 24 a driving pulley, 25 the outlet cover plate, 26 the opening lever, 27 the outlet plate, 28 the baseplate, 29 the water and steam valve, 30 the overflow, 31 the pedestal, 32 the rising pipe, 33 the centrifugal disc, 34 the propellers, 35 the propeller shaft which is partially drilled hollow, 36 a bevel wheel, 37 a bevel wheel, 38 the driving motor, 39 the cross-piece, 40 the centrifugal blades, 41 a step bearing, 42 the flange provided with inlet apertures.

The machine is driven by a pole-changeable electric motor with two or three different speeds.

A normal electric motor is used to drive the propeller shaft which rotates at high speed.

The mode of operation of the machine according to the second exemplified embodiment is as follows:

The container is slightly heated and the mixing arms put into operation at the lowest speed. The chocolate mass in powder form is poured in. The bottom mixing arm 2 with the mass guide plate 14 drives the particles of mass in the horizontal direction towards the walls of the container. The flat pieces 3 drive the particles of mass up on the walls of the container while they are taken over by the aerating plate 4 and driven upwards to the upper edge of the container while being continuously mixed.

In consequence of the displacement of the mass contained in the centre of the container by the mass guide plate 14 towards the walls of the container, large hollow spaces are continually formed in the centre, into which the mass falls from the rotating heap of mass situated above the aerating plate 4.

Intensive aeration of the mass already begins when the latter is in this condition. Beneath the aerating plate 4 there is situated a hollow space which continually draws in air and aerates the particles of mass from below.

As the treatment proceeds, the mass begins to form lumps and this is also the moment when pellets of mass are formed. Any pellets of mass are also raised on to the heap of mass above the aerating plate 4 and from there roll directly to the hollow spaces in the centre of the container. These pellets of mass first pass between the knives 17 of the top mixing arm 16 and are cut vertically thereby. Larger residues of the pellets are then again cut, horizontally, by the knives 15 of the bottom mixing arm 2.

The chocolate mass gradually becomes viscous and it is possible to work with a higher speed of revolution. The aerating plate 4, which is partly submerged beneath the surface 11 of the mass, continuously takes over a thin layer of mass and drives it through between the stripper 5 and the mass separation plates 13. In consequence of the centrifugal force acting on the particles of mass, the latter is thrown in the form of strips, drops or curtains against the walls of the container. These strips of mass come into contact with the air to an increased extent.

After the chocolate mass has been further liquefied, the propeller shaft 35 is rotated rapidly with the aid of the top electric motor 38. The chocolate mass penetrates through the inlet apertures in the flange 42 into the rising pipe 32 and is driven by the propellers 34 to the upper edge of the rising pipe. The centrifugal blades 40, which are fastened to the centrifugal disc 33, throw the mass in the form of a curtain against the inner wall of the container 1.

Not only is the chocolate mass thrown off, however, but the blades 40 suck air in through the air holes in the hub from the hollow shaft 35, and throw it off together with the curtains of mass. The curtains of mass are thus continually bathed and traversed by air.

In addition to a rapid development of aroma, the chocolate mass is intensively freed from moisture and acid, and homogenised. The previously very wearisome conching process can be shortened to a fraction of the time hitherto required.

The mass is emptied from the container by moving the outlet cover plate 25 upwards by means of the lever 26.

I claim:

1. A mixing and refining machine comprising an upright container for a mass of material to be mixed; a temperature controlling jacket surrounding said container; a forwardly convex mixing arm mounted for rotation about the vertical axis of the container and having its forward surface constituting a generally rectangular baffle; an upstanding deflector piece mounted on said arm adjacent the side wall of the container and rearwardly and upwardly inclined with respect to the bottom thereof at a small angle such that rotation of the arm causes upward circulation of the material adjacent the bottom of the mass; an aerating plate secured to said arm at approximately the normal level of the free surface of the mass of material to be mixed and inclined to the said surface at a small angle such that its leading edge penetrates the mass during rotation of the said arm and causes a layer thereof to be lifted and thrown off in the wake of the said areating plate in a substantially horizontal stream above the surface of the mass; and a second generally radial mixing arm disposed opposite the said forwardly convex arm and carrying an inwardly deflected baffle for directing material towards the root of the said forwardly convex arm.

2. A mixing and refining machine comprising an upright container for the mass of material to be treated; means for controlling the temperature within the container; a central vertical driving shaft within the container; a pair of opposed arms extending substantially radially from said shaft at different levels within the lower part of said container; a deflector piece carried on the free end of each arm and inclined rearwards and upwards at a small angle to the bottom of the container for causing upward circulation of the mass of the material during rotation of the arms; a vertical stripper blade mounted on the upper arm above the deflector piece and having its leading edge lying close to the container wall and its trailing edge deflected inwards; and an aerating plate carried on the upper arm adjacent the outer end thereof, at approximately the normal level of the free surface of the mass to be treated, with its leading edge lower than its trailing edge to present a generally plane upwardly inclined surface to the upper layer of material under treatment.

3. A mixing and refining machine according to claim 2 including cutter blades mounted on each arm adjacent the root thereof.

4. A mixing and refining machine according to claim 3 wherein the cutter blades on the lower arm are horizontal and the cutter blades on the upper arm lie in vertical planes.

5. A mixing and refining machine comprising an upright container for material to be treated; a central driving shaft mounted coaxially with the container in the lower part thereof; at least one generally radial arm secured to the said shaft in the lower part of the container; a deflector piece mounted on the free end of said arm and inclined upwards and rearwards at a small angle to the bottom of the container to promote upward circulation of material at the walls of the container; an aerating plate on said arm located at approximately the level of the free surface of the material under treatment and inclined upwards and rearwards at a small angle to said free surface; a propeller shaft projecting coaxially with the driving shaft into the upper part of the container; a propeller blade on said propeller shaft; an open-ended pipe surrounding said propeller with working tolerance and carried on said driving shaft; a centrifugal disc fixed on said propeller shaft above the top end of said pipe with clearance for the radial escape of material drawn up said pipe by said propeller; and means for supplying air into said escaping material.

6. A mixing and refining machine according to claim 5 wherein the underside of said centrifugal disc is provided with a number of substantially radial ribs, and the space between each pair of adjacent ribs communicates with atmosphere through a radial port and a counterbore in said propeller shaft.

References Cited in the file of this patent

UNITED STATES PATENTS

| | | |
|---|---|---|
| 1,337,333 | Simpson | Apr. 20, 1920 |
| 1,778,049 | Thornton et al. | Oct. 14, 1930 |
| 1,870,355 | Burns et al. | Aug. 9, 1932 |
| 2,585,767 | Guggenheim et al. | Feb. 12, 1952 |

FOREIGN PATENTS

| | | |
|---|---|---|
| 411,763 | Germany | June 14, 1934 |
| 910,244 | Germany | Apr. 29, 1954 |